United States Patent [19]
Smith et al.

[11] Patent Number: 5,981,634
[45] Date of Patent: Nov. 9, 1999

[54] METHOD OF PREPARING PHOTOCHROMIC ARTICLES

[75] Inventors: Robert A. Smith, Murrysville; Christopher D. Selvig, Pittsburgh, both of Pa.

[73] Assignee: PPG Industries Ohio, Inc., Cleveland, Ohio

[21] Appl. No.: 09/120,654

[22] Filed: Jul. 22, 1998

Related U.S. Application Data

[63] Continuation of application No. 08/758,068, Nov. 27, 1996, abandoned.

[51] Int. Cl.$^6$ .................................. C08J 5/45; C08J 5/15; G02B 5/23; G02C 7/10
[52] U.S. Cl. ........................ 524/87; 524/90; 524/107; 524/112; 252/586; 351/163; 351/159; 359/642
[58] Field of Search ........................... 522/75, 163, 182, 522/183, 135, 142; 252/586; 351/163, 159; 359/642; 524/87, 90, 107, 112

[56] References Cited

U.S. PATENT DOCUMENTS

| | | | |
|---|---|---|---|
| 3,361,706 | 1/1968 | Meriwether et al. | 260/39 |
| 3,562,172 | 2/1971 | Ono et al. | 252/300 |
| 3,567,605 | 3/1971 | Becker | 204/158 |
| 3,578,602 | 5/1971 | Ono et al. | 252/300 |
| 3,716,571 | 2/1973 | Berlin et al. | 260/463 |
| 3,785,850 | 1/1974 | Parker | 117/93.31 |
| 4,166,043 | 8/1979 | Uhlmann et al. | 252/300 |
| 4,215,010 | 7/1980 | Hovey et al. | 252/300 |
| 4,342,668 | 8/1982 | Hovey et al. | 252/586 |
| 4,367,170 | 1/1983 | Uhlmass et al. | 252/586 |
| 4,637,698 | 1/1987 | Kwak et al. | 351/163 |
| 4,816,584 | 3/1989 | Kwak et al. | 544/71 |
| 4,818,096 | 4/1989 | Heller et al. | 351/163 |
| 4,826,977 | 5/1989 | Heller et al. | 544/70 |
| 4,880,667 | 11/1989 | Welch | 427/160 |
| 4,931,219 | 6/1990 | Kwiatkowski et al. | 252/586 |
| 4,931,220 | 6/1990 | Haynes | 252/586 |
| 5,066,818 | 11/1991 | Van Gemert et al. | 549/389 |
| 5,238,931 | 8/1993 | Yoshikawa et al. | 514/184 |
| 5,274,132 | 12/1993 | Van Gemert | 549/389 |
| 5,384,077 | 1/1995 | Knowles | 252/586 |
| 5,405,958 | 4/1995 | Van Gemert | 544/71 |
| 5,429,774 | 7/1995 | Kumar | 252/586 |
| 5,466,398 | 11/1995 | Van Gemert et al. | 252/586 |
| 5,479,555 | 12/1995 | Rot et al. | 385/145 |
| 5,621,017 | 4/1997 | Kobayakawa et al. | 522/16 |

FOREIGN PATENT DOCUMENTS 62-195383  8/1987  Japan.

OTHER PUBLICATIONS

*Techniques of Chemistry*, Photochromism, vol. 3, "Photochromic Processes Involving Heterolytic Cleavage", R.C. Bertelson, Chap. 3, pp. 48–55, pp. 252–254, pp. 399, p. 842, Wylie–Interscience.

*Primary Examiner*—Susan W. Berman
*Attorney, Agent, or Firm*—Irwin M. Stein; James R. Franks

[57] ABSTRACT

A method of preparing photochromic materials useful for optical applications, and photochromic materials prepared by such method, are described. Such method comprises polymerizing a blend of a polyol[(meth)acryloyl terminated carbonate] monomer and a photochromic amount of an organic photochromic substance, thereby forming a photochromic material. A preferred polyol[(meth)acryloyl terminated carbonate] monomer is diethylene glycol bis [(methacryloyloxy)ethylene carbonate]. Polymerization may be performed by free radical initiation using thermal initiators, photoinitiators or a combination of such initiators. Photochromic materials prepared by such method may be used in optical applications, e.g., photochromic lenses.

17 Claims, No Drawings

METHOD OF PREPARING PHOTOCHROMIC ARTICLES

This application is a continuation of application Ser. No. 08/758,068, filed Nov. 27, 1996, now abandoned.

DESCRIPTION OF THE INVENTION

The present invention relates to a method of preparing photochromic polymeric materials, e.g., materials useful for optical applications, and to photochromic materials prepared by such method. More particularly, the present invention relates to a method of preparing photochromic materials comprising polymerizing a blend of a polyol[(meth)acryloyl terminated carbonate] monomer and a photochromic amount of a photochromic substance. The present invention relates also to a method of preparing photochromic articles having a predetermined shape. As used herein, the term "(meth) acryloyl", is meant to include both acryloyl and methacryloyl.

Photochromic materials may be prepared from homopolymers and copolymers of various monomers, e.g., polyol (allyl carbonate) monomers, such as diethylene glycol bis (allyl carbonate) monomer. The preparation of such photochromic materials typically includes an imbibition step, which involves coating a pre-cast article with a solution containing a photochromic substance followed by the application of heat to imbibe the photochromic substance into the cast article. With many monomers that are used to prepare photochromic materials, such as diethylene glycol bis(allyl carbonate) monomer, the resulting polymerizate is typically undercured in order to imbibe the polymerizate with the photochromic substance. Following imbibition, a post cure step is often required to fully cure the polymerizate. Such a multi-step process may require extra labor, time and equipment.

Photochromism is a phenomenon involving a change in color of a photochromic substance, or an article or a material containing such a substance, upon exposure to light radiation containing ultraviolet rays, such as ultraviolet radiation contained in sunlight or in the light of a mercury lamp, and a reversion to the original color when the influence of the ultraviolet radiation is discontinued. Discontinuation of the ultraviolet radiation can be achieved for example by storing the photochromic substance or article in the dark or by removing the source of ultraviolet radiation. Recently, photochromic plastic materials, particularly plastic materials for optical applications, have been the subject of considerable attention. In particular, photochromic ophthalmic plastic lenses have been investigated in part due to the weight advantage that they can offer relative to ophthalmic lenses made of glass. In addition, photochromic transparencies for vehicles, such as automobiles and airplanes, have been of interest because of the potential safety features that such transparencies offer.

Methods of preparing polyol[(meth)acryloyl terminated carbonate] monomers, particularly diethylene glycol bis [(methacryloyloxy)ethylene carbonate], are known. However, homopolymers prepared from polyol[(meth) acryloyl terminated carbonate] monomers have not been used in the preparation of photochromic materials, e.g., photochromic articles useful for optical applications.

U.S. Pat. No. 3,785,850 discloses a method of applying acrylic functional carbonate esters as coatings over substrates such as wood, metal and plastic. These coatings are cured over the substrates to which they are applied using ionizing irradiation. The acrylic functional carbonate esters are described as being the reaction product of a polychloroformate, which is formed from the reaction of phosgene and a polyhydroxy containing compound, and an acrylate containing one hydroxyl group. U.S. Pat. No. 3,716, 571 discloses unsaturated oligocarbonate acrylates and a process for producing the same. These unsaturated oligocarbonate acrylates are described as being made by a process which includes reacting monoesters of alkylene glycols and acids of the acrylic series with bischloroformates of glycols or bisphenols or with oligomeric compounds containing terminal bischloroformate groups. Unsaturated oligocarbonate acrylates according to U.S. Pat. No. 3,716,571 are disclosed as having utility in the production of optical details and cast plastics.

Neither of the above patents discloses a method for preparing photochromic materials comprising polymerizing a blend of polyol[(meth)acryloyl terminated carbonate] monomer and a photochromic amount of an organic photochromic substance. The above patents do not disclose photochromic materials prepared in accordance with the present invention.

It has now been discovered that polymerizing a blend of polyol[(meth)acryloyl terminated carbonate] monomer and a photochromic amount of a photochromic substance results in the preparation of photochromic materials useful for optical applications. Such method does not require an imbibition step to prepare the photochromic material.

In accordance with the present invention, a polyol[(meth) acryloyl terminated carbonate] monomer is blended with an organic photochromic substance and polymerized. The monomer can be represented by the following general formula I,

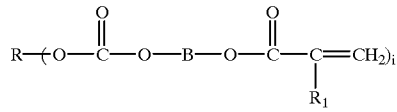

wherein R is a radical derived from a polyol, $R_1$ is hydrogen or methyl, i is a whole number from 2 to 6, preferably 2 to 3, more preferably 2, and B is a divalent linking group selected from the group consisting of straight or branched chain alkylene (usually containing from 1 to 8, e.g., 2 to 4, carbon atoms), cyclic alkylene, e.g., $C_5$–$C_6$ cyclic alkylene, phenylene and $C_1$–$C_4$ alkyl substituted phenylene.

As used herein with regard to e and f, unless otherwise stated, "number" is meant to mean "average number". Other than in the operating examples, or where otherwise indicated, all numbers expressing quantities of ingredients or reaction conditions used herein are to be understood as modified in all instances by the term "about".

DETAILED DESCRIPTION OF THE INVENTION

In accordance with the present invention, there is provided a method for preparing a photochromic material useful for optical applications which includes polymerizing a blend of a monomer as described above and an organic photochromic substance. The polyol[(meth)acryloyl terminated carbonate] monomers that may be used in the aforedescribed method are (meth)acryloyl terminated carbonates of linear or branched aliphatic or aromatic polyols, e.g., aliphatic glycol bis[(meth)acryloyl terminated carbonate] compounds, or alkylidene bisphenol bis[(meth)acryloyl) terminated carbonate] compounds. These monomers may be described as alpha-beta unsaturated polycarbonates of polyols, e.g., glycols. The monomer may be prepared by procedures well known in the art, e.g., as described in U.S. Pat. Nos. 3,716,571 and 3,785,850.

In reference to general formula I, R is a polyvalent radical derived from a polyol which can be an aliphatic, cycloaliphatic or an aromatic polyol containing 2, 3, 4, 5 or 6 hydroxy groups. Typically, the polyol contains 2 hydroxy groups, i.e., a glycol or bisphenol. The aliphatic polyol may be linear or branched and contain from 2 to 10 carbon atoms. Commonly, the aliphatic polyol is an alkylene glycol having from 2 to 4 carbons atoms, e.g., ethylene glycol, propylene glycol, trimethylene glycol, and tetramethylene glycol, or a poly($C_2$–$C_4$) alkylene glycol, e.g., diethylene glycol, triethylene glycol, etc. Other useful polyols include aromatic polyols such as bisphenols, e.g., 4,4'-isopropylidenediphenol, and cycloaliphatic polyols such as biscyclohexanols, e.g., 4,4'-isopropylidenebiscyclohexanol.

Specific examples of polyol[(meth)acryloyl terminated carbonate] monomers include ethylene glycol bis[(methacryloyloxy)ethylene carbonate], ethylene glycol bis[(acryloyloxy)ethylene carbonate], diethylene glycol bis[(methacryloyloxy)ethylene carbonate], diethylene glycol bis[(acryloyloxy)ethylene carbonate], triethylene glycol bis[(methacryloyloxy)ethylene carbonate], triethylene glycol bis[(acryloyloxy)ethylene carbonate], propylene glycol bis[(methacryloyloxy)ethylene carbonate], propylene glycol bis[(acryloyloxy)ethylene carbonate], 1,3-propanediol bis[(methacryloyloxy)ethylene carbonate], 1,3-propanediol bis[(acryloyloxy)ethylene carbonate], 1,3--butanediol bis[(methacryloyloxy)ethylene carbonate], 1,3--butanediol bis[(acryloyloxy)ethylene carbonate], 1,4 butanediol bis[(methacryloyloxy)ethylene carbonate], 1,4 butanediol bis[(acryloyloxy)ethylene carbonate], dipropylene glycol bis[(methacryloyloxy)ethylene carbonate], dipropylene glycol bis[(acryloyloxy)ethylene carbonate], trimethyleneglycol bis[(methacryloyloxy)ethylene carbonate], trimethyleneglycol bis[(acryloyloxy)ethylene carbonate], pentamethylene glycol bis[(methacryloyloxy)ethylene carbonate], pentamethylene glycol bis[(acryloyloxy)ethylene carbonate], isopropylidene bisphenol bis[(methacryloyloxy)ethylene carbonate], isopropylidene bisphenol bis[(acryloyloxy)ethylene carbonate], diethyleneglycol bis[(methacryloyloxy)2-methyl-ethylene carbonate], diethyleneglycol bis[(methacryloyloxy)1,4-cyclohexylene carbonate], diethyleneglycol bis[(methacryloyloxy)1,4-phenylene carbonate], and diethyleneglycol bis[(methacryloyloxy)2,5-dimethyl-1,3-phenylene carbonate]. The preferred polyol[(meth)acryloyl terminated carbonate] monomer is diethylene glycol bis[(methacryloyloxy)ethylene carbonate].

The blend used in the method according to the present invention includes also a photochromic amount of an organic photochromic substance. Photochromic compounds that may be utilized with the blend of the present invention are organic photochromic compounds or substances containing same. These photochromic compounds are added to such blends prior to polymerization.

A first group of organic photochromic substances contemplated for use to form the photochromic materials of the present invention are those having an activated absorption maximum within the visible range of greater than 590 nanometers, e.g., between greater than 590 to 700 nanometers. These substances typically exhibit a blue, bluish-green, or bluish-purple color when exposed to ultraviolet light in an appropriate solvent or matrix. Many of such compounds are described in the open literature. For example, spiro(indoline)naphthoxazines have been described, among others, in U.S. Pat. Nos. 3,562,172; 3,578,602; 4,215,010; and 4,342,668. Spiro(indoline) naphthoxazines having certain substituents at the 8' and 9' positions of the naphthoxazine portion of the molecule are described in U.S. Pat. No. 5,405,958. Spiro(indoline) pyridobenzoxazines are described in U.S. Pat. No. 4,637,698. Spiro(benzindoline)pyridobenzoxazines and spiro(benzindoline)naphthoxazines are described in U.S. Pat. No. 4,931,219. Spiro(benzindoline)naphthopyrans are described in Japanese Patent Publication 62/195383. Spiro(indoline) benzoxazines are described in U.S. Pat. No. 4,816,584. Spiro(indoline)benzopyrans, spiro(indoline)naphthopyrans and spiro(indoline)quinopyrans are described, for example, in U.S. Pat. No. 4,880,667. Benzopyrans and naphthopyrans having a nitrogen-containing substituent at the 2-position of the pyran ring are described in U.S. Pat. No. 4,818,096. Spiro(indoline)pyrans are also described in the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic materials of the present invention are those having at least one absorption maximum and preferably two absorption maxima, within the visible range of between 400 and less than 500 nanometers. These substances typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic materials of the present invention are those having an absorption maximum within the visible range of between 400 to 500 nanometers and another absorption maximum within the visible range of between 500 to 700 nanometers. These substances typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such substances are the subject of U.S. Pat. No. 5,429,774.

Other photochromic substances contemplated are photochromic organo-metal dithizonates, i.e., (arylazo)-thioformic arylhydrazidates, e.g., mercury dithizonates which are described in, for example, U.S. Pat. No. 3,361,706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic compounds in the aforedescribed patents are incorporated herein, in toto, by reference. The photochromic materials of the present invention may contain one photochromic compound or a mixture of photochromic compounds, as desired. Mixtures of photochromic compounds may be used to attain certain activated colors such as a near neutral gray or brown.

Each of the photochromic substances described herein may be used in amounts and in a ratio (when mixtures are used) such that a photochromic article into which the mixture of compounds has been incorporated exhibits a desired resultant color, e.g., a substantially neutral color such as shades of gray or brown when activated with unfiltered sunlight, i.e., as near a neutral color as possible given the colors of the activated photochromic compounds. The relative amounts of the aforesaid photochromic compounds used will vary and depend in part upon the relative intensities of the color of the activated species of such compounds, and the ultimate color desired.

The amount of photochromic substance used in the blend polymerized in accordance with the method of the present invention is not critical provided that a sufficient amount is used to produce a photochromic effect discernible to the naked eye upon activation. Generally such amount can be described as a photochromic amount. The particular amount used depends often upon the intensity of color desired upon irradiation thereof. Typically, the more photochromic substance used in the blend, the greater is the color intensity. Generally, the amount of total photochromic substance used will range from 0.001 to 10% by weight, preferably from 0.005% to 1% by weight and more preferably from 0.01 to 0.5% by weight based on the total weight of the blend. Photochromic materials prepared in accordance with the method of the present invention will have the organic photochromic substance(s) distributed throughout the photochromic material.

Polymerizing the blend in accordance with the method of the present invention may be accomplished by adding to the blend an initiating amount of an initiator capable of generating free radicals, such as organic peroxy compounds or azobis(organonitrile) compounds, i.e., an initiator. Methods for polymerizing polyol[(meth)acryloyl terminated carbonate] compositions are well known to the skilled artisan and any of those well known techniques may be used to polymerize the aforedescribed blends. Such polymerization methods include thermal polymerization, photopolymerization or a combination thereof.

Examples of suitable organic peroxy compounds, that may be used as thermal polymerization initiators include: peroxymonocarbonate esters, such as tertiarybutylperoxy isopropyl carbonate; peroxydicarbonate esters, such as di(2-ethylhexyl)peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Preferred thermal initiators are those that do not attack the photochromic substance and do not discolor the resulting photochromic material.

In preparing photochromic materials according to the method of the present invention, it is preferred to use a thermal initiator which will not interfere with the photochromic performance of the photochromic substance(s) that are present. Such preferred thermal initiators include azobis (organonitrile) compounds. Examples of suitable azobis (organonitrile) compounds, that may be used as thermal polymerization initiators include: azobis(isobutyronitrile) and azobis(2,4-dimethylvaleronitrile). A preferred thermal initiator is azobis(isobutyronitrile).

The amount of thermal polymerization initiator used to initiate the polymerization of the blend used in the method of the present invention may vary and will depend on the particular initiator used. Only that amount that is required to initiate and sustain the polymerization reaction is required, i.e., an initiating amount. With respect to the preferred azobis(organonitrile) compound, azobis(isobutyronitrile), typically between 0.001 and 1 part of that initiator per 100 parts of the monomer (phm) may be used. More usually, between 0.01 and 1 phm are used to initiate the polymerization. Typically, the thermal cure cycle involves heating the blend in the presence of the initiator from room temperature to 85° C. to 125° C. over a period of from 2 hours to 30 hours.

Photopolymerization of the blend in accordance with the method of the present invention may be carried out in the presence of a photopolymerization initiator using ultraviolet light, visible light, or a combination thereof. Examples of suitable photopolymerization initiators include benzoin, benzoin methyl ether, benzoin isobutyl ether benzophenol, acetophenone, 4,4'-dichlorobenzophenone, diethoxyacetophenone, 2-hydroxy-2-methyl-1-phenylpropan-1-one, 1-hydroxycyclohexyl phenyl ketone, 2-isopropylthixantone and 2,4,6-trimethylbenzoyldiphenylphosphine oxide. The amount of photopolymerization initiator used to initiate and polymerize the blend according to the method of the present invention may vary and will depend on the particular initiator used. Only that amount that is required to initiate and sustain the polymerization reaction is required, i.e., an initiating amount. The photopolymerization initiator is typically used in an amount from 0.01% to 2% by weight, based on the weight of the blend.

The light source used for the photopolymerization is preferably selected from those which emit ultraviolet light. The light source is preferably a mercury lamp, a germicidal lamp or a xenon lamp. Visible light, e.g., sunlight, may also be used. The exposure time may differ depending upon, e.g., the wavelength and intensity of the light source and the shape of the mold, and is typically determined empirically.

The amount of thermal polymerization initiator or photopolymerization initiator, and the consequent cure cycle should be adequate to produce a photochromic material according to the method of the present invention having a 15 second Barcol hardness of at least 1, preferably, at least 4, e.g., from 4 to 35.

A particularly preferred embodiment of the present invention makes use of the following blend: the monomer described with reference to general formula I wherein the polyol from which R is derived is diethylene glycol, $R_1$ is methyl, and B is ethylene; and a photochromic amount of an organic photochromic substance selected from at least one of spiro(indoline)naphthoxazines, spiro(indoline) benzoxazines, benzopyrans, naphthopyrans, chromenes, organo-metal dithizonates, fulgides, fulgimides and mixtures of such organic photochromic substances. This blend is polymerized using a thermal free radical polymerization initiator selected from azobis(isobutyronitrile), azobis(2,4-dimethylvaleronitrile), or a combination thereof, preferably azobis(isobutyronitrile).

In a further embodiment, it is contemplated that the blend useful in the method of the present invention may be added to a mold having a predetermined shape and polymerized. Such an embodiment will result in the formation (casting) of a photochromic article of predetermined shape, e.g., an ophthalmic lens.

Photochromic materials-obtained from polymerization of polymerizable blends useful in the practice of the method according to the present invention will be solid and preferably transparent or optically clear so that they may be used for optical lenses, such as plano and ophthalmic lenses, sun lenses, window, automotive transparencies, e.g., windshields, T-roofs, sidelights and backlights, and for aircraft transparencies, etc. When used for optical applications, e.g., lenses, the photochromic materials should be transparent to that portion of the electromagnetic spectrum which activates the photochromic substance(s) present in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form.

Various conventional additives may be incorporated into the polymerizable blend used in accordance with the method of the present invention. Such additives may include light stabilizers, heat stabilizers, antioxidants, ultraviolet light absorbers, mold release agents, static (non-photochromic) dyes, pigments, polymerization inhibitors to promote stability during storage, and ultraviolet light absorbers (other than the photochromic compounds). In addition, it is contemplated that a form of organic photochromic substance resistant to the effects of the initiator may also be used in the method of the present invention. Such organic photochromic substances include photochromic pigments and photochromic compounds encapsulated in metal oxides, the latter of which are described in U.S. Pat. Nos. 4,166,043 and 4,367,170. Antiyellowing additives, e.g., 3-methyl-2-butenol, organo pyrocarbonates and triphenyl phosphite [CAS 101-02-0], may also be added to the polymerizable blend of the present invention to enhance resistance to yellowing.

It is also contemplated that a polymerization moderator, or mixtures of polymerization moderators, may be added to the blend of components used in accordance with the method of the present invention to minimize the formation of distortions, such as striations, in photochromic materials obtained therefrom. Suitable polymerization moderators include for example, dilauryl thiodipropionate, terpinolene, 1-isopropyl-4-methyl-1,4-cyclohexadiene, 1-isopropyl-4-methyl-1,3-cyclohexadiene, 1,3-diisopropenylbenzene, alpha-methyl styrene, 2,4-diphenyl-4-methyl-l-pentene, 1,1-diphenylethylene, cis-1,2-diphenylethylene, 2,6-dimethyl-2,4,6-octatriene, 4-tert-butylpyrocatechol, and mixtures thereof. The polymerization moderator may be added to blends used in accordance with the method of the present invention in an amount from 0.01% to 20% by weight, preferably from 0.1% to 10% by weight and more preferably from 0.3% to 5% by weight, based on the total weight of the blend.

It is further contemplated that a flexibilizing additive having no free radical polymerizable groups, henceforth referred to as a nonpolymerizable flexibilizing additive, may be added to blends used in accordance with the method of the present invention. The nonpolymerizable flexibilizing additive, or mixtures of nonpolymerizable flexibilizing additives, may be added in an amount of from 0.05% to 15%, preferably from 0.5% to 10% and more preferably from 2% to 6% by weight, based on the total weight of the monomer blend. The nonpolymerizable flexibilizing additive may be nonaromatic or aromatic.

Examples of suitable nonpolymerizable flexibilizing additives include, alkoxylated phenol benzoate, alkoxylated naphthol benzoate, 1,3-bis(phenylthio)propane, bis(phenylthio) alkylene ether, the reaction product of phenyl chloroformate and dimercaptan, the reaction product of dimercaptan and phosgene endcapped with phenol, cinnamates, triphenyl phosphite, tri(2-ethylhexyl) trimellitate, triisodecyl trimellitate, poly(alkylene glycol) dinaphthoate, 2-ethylhexyl diphenylphosphate, isodecyl diphenyl phosphate, tricresyl phosphate, poly(alkylene glycol)dibenzoates, e.g., poly(ethylene glycol)dibenzoate and poly(propylene glycol) dibenzoate, esters of phthalic acid, isophthalic acid, and terephthalic acid, e.g., dioctyl phthalate, and a member represented by the following general formula II:

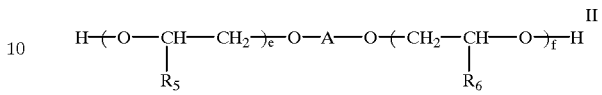

wherein e and f are each a positive number, the sum of e and f being from 0 to 70, $R_5$ and $R_6$ are each hydrogen or $C_1$ to $C_2$ alkyl, preferably hydrogen or methyl and A is a divalent linking group selected from the group consisting of straight or branched chain alkylene (usually containing from 1 to 8 carbon atoms), phenylene, $C_1$–$C_9$ alkyl substituted phenylene and a group represented by general formula III,

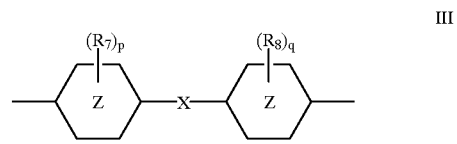

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —C($CH_3$)$_2$—, —C($CH_3$)($C_6H_5$)— or

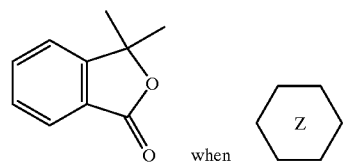

when is the divalent benzene group, and X is O, S, —$CH_2$—, or —C($CH_3$)$_2$— when

is divalent cyclohexane group.

Nonpolymerizable flexibilizing additives, described with reference to general formula II where the sum of e and f is greater than 0, may be prepared by methods which are well known in the art. One such commonly used method involves reacting a polyol, e.g., 4,4'-isopropylidenediphenol, with an oxirane containing substance, e.g., ethylene oxide, propylene oxide, α-butylene oxide or β-butylene oxide to form the nonpolymerizable flexibilizing additive represented by general formula II.

Examples of suitable polyols, for preparing nonpolymerizable flexibilizing additives represented by general formula II wherein the sum of e and f is greater than 0, or for use as the nonpolymerizable flexibilizing additive wherein the sum of e and f is 0, include: straight chain alkylene glycols such as ethylene glycol, propylene glycol, trimethylene glycol, tetramethylene glycol, or diethylene glycol, triethylene glycol; branched chain alkylene glycols such as 1,2-propanediol, 2-methyl-1,3-propanediol, 1,2-butanediol, 1,3-butanediol, 2,3-butanediol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, 4-hydroxybenzyl alcohol, and 3,5-bis(1,1-dimethylethyl)-4-hydroxy-benzenemethanol; dihydroxybiphenyls such as 4,4'-dihydroxybiphenyl and 2,2'dihydroxybiphenyl; bisphenols such as 4,4'-isopropylidenediphenol; 4,4'-oxybisphenol; 4,4'-dihydroxybenzenephenone; 4,4'-thiobisphenol; phenol-phthlalein; bis(4-hydroxyphenyl)methane; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidenebiscyclohexanol; 4,4'-oxybiscyclohexanol; 4,4'-thiobiscyclohexanol; and bis(4-hydroxycyclohexanol) methane.

A preferred nonpolymerizable flexibilizing additive may be defined with reference to general formula II wherein the sum of e and f is from 25 to 35, $R_5$ and $R_6$ are each hydrogen, and A is a divalent linking group according to general formula III, wherein

represents a divalent benzene group, p and q are each 0 and X is —C(CH$_3$)$_2$—. Another preferred nonpolymerizable flexibilizing additive is poly(ethylene glycol)dibenzoate, the poly(ethylene glycol) precursor of which has a number average molecular weight of from 100 to 1000 grams/mole.

The present invention is more particularly described in the following examples, which are intended as illustrative only, since numerous modifications and variations therein will be apparent to those skilled in the art. Unless otherwise specified, all parts and all percentages are by weight.

EXAMPLE 1

Table 1 describes a blend which is useful in the practice of the present invention. The level of thermal free radical initiator used in Example 1 was selected such that photochromic articles prepared therefrom would be both substantially completely cured and have adequate photochromic properties.

TABLE 1

| Example | 1 |
|---|---|
| Basic Ingredients, Parts | |
| Polyol (methacryloyl carbonate) monomer[a] | 100.00 |
| azobis (isobutyronitrile) | 0.04 |
| Photochromic Substance[b] | 0.049 |

[a]diethyleneglycol bis[(methacryloyloxy)ethyl carbonate]monomer.
[b]1,3 dihydro-9'-methoxy-1,3,3,5,6 pentamethylspiro{2H-indole-2,3'-[3H]naphth[2,1–6][1,4]oxazine}

Cast sheets of the blend represented by Example 1 of Table 1 were prepared in the following manner. The blend was transferred to a suitable vessel and the designated amount of initiator was added. The resulting initiated blend was mixed using a magnetic stir plate and magnetic stir bar at a temperature of 4° C. The initiated blend was then degassed for 5 to 10 minutes at 125 Torr, then poured into glass molds having the following interior dimensions, 150× 150×2 mm. The filled molds were then placed in a heated water bath and cured using the cure cycle described in Table 2. The cure cycle used was optimized so that photochromic articles obtained therefrom would be substantially completely cured. The cast sheets were then cut into 40×40×2 mm photochromic test squares. Photochromic properties of photochromic test squares according to Example 1 were measured and the results are tabulated in Table 3.

TABLE 2*

| Cure Cycles | |
|---|---|
| Cumulative Hours | Oven Temperature °C. |
| 0 | 39 |
| 4 | 90 (end of cycle) |

*The rate of temperature change represented in Table 2 was, in all instances, linear.

EXAMPLES 2 AND 3

Undercured cast sheets prepared from homopolymers of diethylene glycol bis(allyl carbonate) monomer were obtained from Innovision Inc., cut into 40×40×2 mm test squares, and then imbibed with 1,3 dihydro-9'-methoxy-1, 3,3,5,6 pentamethylspiro{2H-indole-2,3'-[3H]naphth[2,1-6][1,4]oxazine}. The imbibition process used was as follows: Resin solutions of the photochromic substance were spin coated onto one side of each diethylene glycol bis(allyl carbonate) test square. The coated diethylene glycol bis(allyl carbonate) test squares were then allowed to dry under an infrared lamp for 20 minutes followed by heating for 2 hours in a forced air oven set at 150° C. The imbibed diethylene glycol bis(allyl carbonate) test squares were removed from the oven, allowed to cool to room temperature, and then thoroughly washed with 32° C. water followed by wiping with acetone to remove the resin solution. These diethylene glycol bis(allyl carbonate) test squares were imbibed to a degree such that a Net Absorbance at 346 nm of 2.0 was obtained. By "undercured" it is meant that the cast sheets prepared from homopolymers of diethylene glycol bis(allyl carbonate) monomer were not fully cured prior to imbibing with the photochromic substance. Undercured cast sheets, prepared from homopolymers of diethylene glycol bis(allyl carbonate) monomer obtained from Innovision Inc. typically have a 15 second Barcol Hardness of 10, while such substantially completely cured cast sheets typically have a 15 second Barcol Hardness of 20 to 22.

Photochromic performance data for the photochromic test squares prepared from the blend described in Example 1 and an imbibed diethylene glycol bis(allyl carbonate) test square were determined. The photochromic test squares were placed in the black box having a forced air temperature controlled feed back loop. The test squares were initially exposed to a black light for two hours while in the black box, during which time the temperature within the box was lowered to 15° C. Using the forced air temperature controlled feed back loop, the test squares within the black box were slowly heated. Values for activated absorbance were determined using a Hoya UL6000 Light Meter at various intervals and the temperature within the black box was noted.

The following Table 3 lists photochromic performance data obtained from a photochromic test square prepared from the blend described in Example 1 and an imbibed diethylene glycol bis(allyl carbonate) test square.

TABLE 3

| Photochromic Performance | | |
|---|---|---|
| Example | 2[e] | 3[f] |
| Test | | |
| Net Absorbance[c] at 346 nm | 2.0 | 2.0 |
| Activated Absorbance[d] (at 15° C.) | 80 | 84 |
| Activated Absorbance (at 19° C.) | 79 | 81 |
| Activated Absorbance (at 23° C.) | 72 | 74 |
| Activated Absorbance (at 27° C.) | 61 | 68 |
| Activated Absorbance (at 31° C.) | 50 | 58 |
| Activated Absorbance (at 35° C.) | 40 | 44 |

[c]Net Absorbance at 346 nm, (viz., absorbance of the imbibed test square in the bleached state minus the absorbance of the unimbibed test square) was determined at room temperatures using a Varian Model Cary 3 spectrophotometer.
[d]Activated Absorbance was calculated using the following formula, (100 - % Transmittance), using the method described above. Higher values of Activated Absorbance indicate that the test square in question is darker.
[e]Photochromic test square of imbibed diethylene glycol bis(allyl carbonate).
[f]Photochromic test square prepared from the blend of Example 1.

The data of Table 3 shows that photochromic articles prepared in accordance with the present invention have better photochromic performance properties compared to photochromic articles prepared from homopolymers of diethylene glycol bis(allyl carbonate) monomer into which a photochromic substance had been imbibed. In particular, Table 3 shows that at a given temperature photochromic articles of the present invention have a higher activated absorbance, i.e. they are darker.

The present invention has been described with reference to specific details of particular embodiments thereof. It is not intended that such details be regarded as limitations upon the scope of the invention except insofar as and to the extent that they are included in the accompanying claims.

We claim:

1. A photochromic optical article consisting essentially of:
    (a) a homopolymer of monomer represented by the following general formula,

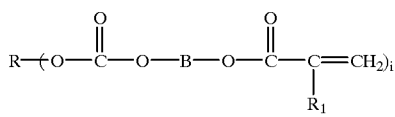

wherein R is a radical derived from a polyol, $R_1$ is hydrogen or methyl, i is a whole number from 2 to 6, and B is a divalent linking group selected from the group consisting of straight or branched chain alkylene, cyclic alkylene, phenylene and $C_1$–$C_4$ alkyl substituted phenylene,
    (b) from 0.05% to 15% by weight, of a nonpolymerizable flexibilizing additive; and
    (c) a photochromic amount of an organic photochromic substance.

2. The photochromic article of claim 1 wherein the polyol from which R is derived is a dialkylene glycol, trialkylene glycol or 4,4'-isopropylidenediphenol, i is 2, and B is a straight or branched chain alkylene.

3. The photochromic article of claim 2 wherein the polyol from which R is derived is diethylene glycol, $R_1$ is methyl, B is ethylene and said organic photochromic substance is selected from the group consisting of spiro(indoline) naphthoxazines, spiro(indoline)benzoxazines, benzopyrans, naphthopyrans, chromenes, organo-metal dithizonates, fulgides, fulgimides and mixtures of said organic photochromic substances.

4. The photochromic article of claim 3 wherein said article is a lens.

5. The photochromic article of claim 1 wherein said nonpolymerizable flexibilizing additive is selected from the group consisting of poly(alkylene glycol)dibenzoate, esters of phthalic acid, esters of isophthalic acid, esters of terephthalic acid, a member represented by the following general formula,

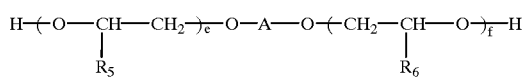

wherein e and f are each a positive number, the sum of e and f being from 0 to 70, $R_5$ and $R_6$ are each hydrogen or $C_1$ to $C_2$ alkyl, and A is a divalent linking group selected from the group consisting of straight or branched chain alkylene, phenylene, $C_1$–$C_9$ alkyl substituted phenylene and a member represented by the following general formula,

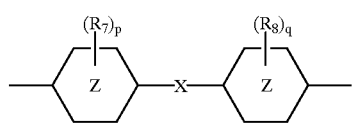

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —C($CH_3$)$_2$—, —C($CH_3$)($C_6H_5$)— or

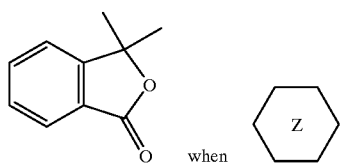

is the divalent benzene group, and X is O, S, —CH$_2$—, or —C(CH$_3$)$_2$— when

is the divalent cyclohexane group, and mixtures of said nonpolymerizable flexibilizing additives.

6. The photochromic article of claim 5 wherein the polyol from which R is derived is a dialkylene glycol, trialkylene glycol or 4,4'-isopropylidenediphenol, i is 2, and B is a straight or branched chain alkylene.

7. The photochromic article of claim 6 wherein the polyol from which R is derived is diethylene glycol, R$_1$ is methyl, B is ethylene and said organic photochromic substance is selected from the group consisting of spiro(indoline) naphthoxazines, spiro(indoline)benzoxazines, benzopyrans, naphthopyrans, chromenes, organo-metal dithizonates, fulgides, fulgimides and mixtures of said organic photochromic substances.

8. The photochromic article of claim 7 wherein said article is an optical lens.

9. A method for preparing a photochromic article comprising polymerizing a blend of:

(a) a monomer represented by the following general formula,

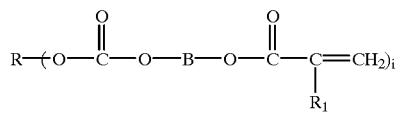

wherein R is a radical derived from a polyol, R$_1$ is hydrogen or methyl, i is a whole number from 2 to 6, and B is a divalent linking group selected from the group consisting of straight or branched chain alkylene, cyclic alkylene, phenylene and C$_1$–C$_4$ alkyl substituted phenylene;

(b) from 0.05% to 15% by weight, based on the total weight of the blend, of a nonpolymerizable flexibilizing additive; and (c) a photochromic amount of an organic photochromic substance.

10. The method of claim 9 wherein the polyol from which R is derived is a dialkylene glycol, trialkylene glycol or 4,4'-isopropylidenediphenol, i is 2 and B is a straight or branched chain alkylene.

11. The method of claim 10 wherein the polyol from which R is derived is diethylene glycol, R$_1$ is methyl and B is ethylene, and said organic photochromic substance is selected from the group consisting of spiro(indoline) naphthoxazines, spiro(indoline)benzoxazines, benzopyrans, naphthopyrans, chromenes, organo-metal dithizonates, fulgides, fulgimides and mixtures of said organic photochromic substances.

12. The method of claim 1 wherein the polyol from which R is derived is a dialkylene glycol, trialkylene glycol or 4,4'-isopropylidenediphenol, i is 2, B is a straight or branched chain alkylene, and said polymerization is initiated with a thermal free radical polymerization initiator.

13. The method of claim 12 wherein the polyol from which R is derived is diethylene glycol, R$_1$ is methyl, and B is ethylene, said organic photochromic substance is selected from the group consisting of spiro(indoline)naphthoxazines, spiro(indoline)benzoxazines, benzopyrans, naphthopyrans, chromenes, organo-metal dithizonates, fulgides, fulgimides and mixtures of said organic photochromic substances, and said thermal free radical polymerization initiator is selected from the group consisting of azobis(isobutyronitrile), azobis(2,4-dimethylvaleronitrile), and mixtures of such initiators.

14. The method of claim 1 wherein a polymerization moderator is included with said blend.

15. The method of claim 14 wherein said polymerization moderator is selected from the group consisting of 1-isopropyl-4-methyl-1,4-cyclohexadiene, 1-isopropyl-4-methyl-1,3-cyclohexadiene, alpha-methyl styrene, 2,4-diphenyl-4-methyl-1-pentene, 1,3-diisopropenylbenzene, and mixtures of said polymerization moderators.

16. The method of claim 1 wherein the nonpolymerizable flexibilizing additive is selected from the group consisting of poly(alkylene glycol)dibenzoate, esters of phthalic acid, esters of isophthalic acid, esters of terephthalic acid, a member represented by the following general formula,

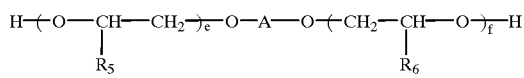

wherein e and f are each a positive number, the sum of e and f being from 0 to 70, R$_5$ and R$_6$ are each hydrogen or C$_1$ to C$_2$ alkyl, and A is a divalent linking group selected from the group consisting of straight or branched chain alkylene, phenylene, C$_1$–C$_9$ alkyl substituted phenylene and a member represented by the following general formula,

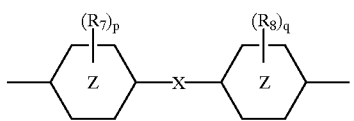

wherein, R$_7$ and R$_8$ are each C$_1$–C$_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —C(CH$_3$)$_2$—, —C(CH$_3$)(C$_6$H$_5$)— or

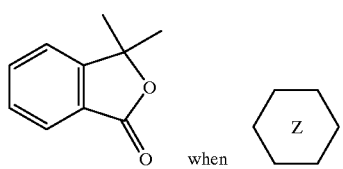 when 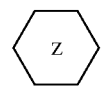
is the divalent benzene group, and X is O, S, —CH$_2$—, or —C(CH$_3$)$_2$— when
is the divalent cyclohexane group, and mixtures of said nonpolymerizable flexibilizing additives.
17. The method of claim 1 wherein said blend is used to prepare optical lenses, automotive transparencies, aircraft transparencies or windows.
* * * * *